United States Patent
Ueno et al.

(10) Patent No.: US 11,688,373 B2
(45) Date of Patent: Jun. 27, 2023

(54) ELECTRIC MUSICAL INSTRUMENT SYSTEM, CONTROL METHOD AND NON-TRANSITORY COMPUTER READABLE MEDIUM T HEREOF

(71) Applicant: Roland Corporation, Shizuoka (JP)

(72) Inventors: Masato Ueno, Shizuoka (JP); Shinji Asakawa, Shizuoka (JP); Hiroshi Yamate, Shizuoka (JP)

(73) Assignee: Roland Corporation, Shizuoka (JP)

( * ) Notice: Subject to any disclaimer, the term of this patent is extended or adjusted under 35 U.S.C. 154(b) by 389 days.

(21) Appl. No.: 17/048,091

(22) PCT Filed: Apr. 19, 2018

(86) PCT No.: PCT/JP2018/016224
§ 371 (c)(1),
(2) Date: Oct. 15, 2020

(87) PCT Pub. No.: WO2019/202718
PCT Pub. Date: Oct. 24, 2019

(65) Prior Publication Data
US 2021/0174774 A1    Jun. 10, 2021

(51) Int. Cl.
*G10H 1/00* (2006.01)
*G10H 1/46* (2006.01)

(52) U.S. Cl.
CPC ............ *G10H 1/0083* (2013.01); *G10H 1/46* (2013.01); *G10H 2220/395* (2013.01); *G10H 2220/401* (2013.01); *G10H 2230/035* (2013.01)

(58) Field of Classification Search
CPC .. G10H 1/0083; G10H 1/46; G10H 2220/395; G10H 2220/401; G10H 2230/035
(Continued)

(56) References Cited

U.S. PATENT DOCUMENTS 8,165,309 B2 * 4/2012 Gustaffsson ........... G10H 3/187
381/98
11,290,839 B2 * 3/2022 Ueno ..................... H04S 3/008
(Continued)

FOREIGN PATENT DOCUMENTS

CN     204482003         7/2015
CN     204482003 U   *   7/2015
(Continued)

OTHER PUBLICATIONS

"Notice of Allowance of European Counterpart Application," dated Nov. 9, 2022, pp. 1-8.
(Continued)

*Primary Examiner* — Christina M Schreiber
(74) *Attorney, Agent, or Firm* — JCIPRNET (57) ABSTRACT

Provided are an electric musical instrument system and a control method thereof. The electric musical instrument system includes a musical sound transmitting means and a musical sound receiving means having a first mode and a second mode that consumes less electric power than the first mode. The musical sound transmitting means has a detecting means for detecting rocking of a musical instrument and a transmitting means that transmits an audio signal emitted from the musical instrument to the musical sound receiving means in the first mode and transmits, when detecting rocking of the musical instruments, detected information to the musical sound receiving means in the second mode. The musical sound receiving means has a controlling means that processes the audio signal received in the first mode and cancels the second mode and changes the mode to the first mode when the detected information is received in the second mode.

20 Claims, 10 Drawing Sheets

(58) Field of Classification Search
USPC .................................................................. 84/1
See application file for complete search history.

(56) References Cited

U.S. PATENT DOCUMENTS

| | | | | |
|---|---|---|---|---|
| 2007/0003073 | A1* | 1/2007 | Iriarte | G10H 1/0083 381/77 |
| 2007/0259689 | A1* | 11/2007 | Kutaragi | G08C 17/02 701/2 |
| 2021/0056942 | A1* | 2/2021 | Yamate | G10H 1/0083 |
| 2021/0174774 | A1* | 6/2021 | Ueno | G10H 1/0083 |
| 2021/0201866 | A1* | 7/2021 | Yokoyama | H04W 76/14 |
| 2021/0241737 | A1* | 8/2021 | Miki | G10H 1/0008 |
| 2022/0157287 | A1* | 5/2022 | Brancalion | G10H 3/143 |
| 2022/0293073 | A1* | 9/2022 | Kim | G10H 1/053 |

FOREIGN PATENT DOCUMENTS

| | | | | |
|---|---|---|---|---|
| EP | 3739568 | | 11/2020 | |
| EP | 3739568 | A1 * | 11/2020 | ............... G10H 1/00 |
| JP | H09269786 | | 10/1997 | |
| JP | H09269786 | A * | 10/1997 | |
| JP | H1020855 | | 1/1998 | |
| JP | H1020855 | A * | 1/1998 | |
| JP | 2001306197 | | 11/2001 | |
| JP | 2001306197 | A * | 11/2001 | |
| JP | 2007086214 | | 4/2007 | |
| JP | 2007086214 | A * | 4/2007 | |
| JP | 2007306070 | | 11/2007 | |
| JP | 2007306070 | A * | 11/2007 | ............. G08C 17/02 |
| WO | 2017127787 | | 7/2017 | |
| WO | WO-2017127787 | A1 * | 7/2017 | ............... G06F 1/28 |

OTHER PUBLICATIONS

"International Search Report (Form PCT/ISA/210) of PCT/JP2018/016224," dated Jun. 26, 2018, with English translation thereof, pp. 1-4.

Line 6, Inc., "Relay G10, Pilot's Guide" 2015, pp. 1-8, Available at: https://line6.com/support/manuals/relayg10/, retrieved on Oct. 14, 2020.

"Search Report of Europe Counterpart Application", dated Nov. 9, 2021, pp. 1-6.

* cited by examiner

ELECTRIC MUSICAL INSTRUMENT SYSTEM, CONTROL METHOD AND NON-TRANSITORY COMPUTER READABLE MEDIUM T HEREOF

CROSS-REFERENCE TO RELATED APPLICATION

This application is a 371 application of the International PCT application serial no. PCT/JP2018/016224, filed on Apr. 19, 2018. The entirety of the above-mentioned patent application is hereby incorporated by reference herein and made a part of this specification.

BACKGROUND

Technical Field

The disclosure relates to an electric musical instrument system, a control method and non-transitory computer readable medium thereof.

Related Art

In the field of electronic musical instruments, systems in which a transmitter connected to a musical instrument transmits an audio signal to outside and an acoustic device such as an amplifier or an effector which receives the audio signal processes the audio signal have become widespread. In particular, transmitting the audio signal wirelessly eliminates the need for a cable connecting between the devices and greatly improves user convenience.

On the other hand, as devices become cordless, the importance of power consumption management is increasing. For example, when an electronic musical instrument or an amplifier is driven by a battery, it is preferable to perform control to suppress power consumption during a period when no performance is going on.

As an invention related thereto, Patent Document 1 discloses an electronic musical instrument wirelessly connected with a performance operation device. The electronic musical instrument monitors only the presence or absence of a performance operation during standby and, when a performance operation is performed, detects the same and returns from the standby state.

RELATED ART DOCUMENTS

Patent Documents

Patent Document 1: Japanese Patent Application Laid-Open No. 2007-86214

SUMMARY

Problems to be Solved

According to the invention described in Patent Document 1, it is possible to suppress power consumption during a period in which no performance is going on. However, this invention has an issue that a time lag occurs at the time of recovery since the operation on the performance operation device is used as a trigger to return from the standby state. When the device returns from the power saving state, since it takes time for the power supply circuit to stabilize, even if a performance operation is performed during this period, a normal sound cannot be outputted. In other words, there is an issue that the performance cannot be immediately started once the power saving state is entered.

The disclosure has been made in view of the above issues, and an objective of the disclosure is to provide an electric musical instrument system which quickly starts a return from a power saving state.

Means for Solving the Problems

The electric musical instrument system according to the disclosure is a system including a musical sound transmitting means which transmits an audio signal emitted from a musical instrument and a musical sound receiving means which receives the audio signal. The musical sound transmitting means is a device which is connected to an electric musical instrument or an electronic musical instrument and transmits the audio signal emitted from the musical instrument to outside. Also, the musical sound receiving means is a device which receives and processes the transmitted audio signal. The musical sound receiving means may be a device which amplifies the audio signal such as an amplifier or a device which processes the audio signal such as an effector. The musical sound transmitting means and the musical sound receiving means are configured to be switchable between a normal operation mode (first mode) and an operation mode consuming less electric power (second mode). By switching the operation mode to the second mode in a period in which the performance is not going on, it is possible to suppress the overall power consumption.

The musical sound transmitting means includes a detecting means which detects rocking of the musical instrument, and a transmitting means which transmits the audio signal to the musical sound receiving means in the first mode and, when the detecting means detects rocking of the musical instrument, transmits detected information to the musical sound receiving means in the second mode. Also, the musical sound receiving means includes a receiving means which receives the audio signal or the detected information, and a controlling means which processes the audio signal that has been received in the first mode and, when the detected information is received in the second mode, cancels the second mode and switches to the first mode.

Accordingly, the musical sound transmitting means transmits the audio signal emitted from the musical instrument when in the first mode, and transmits the detected information for switching the musical sound receiving means to the first mode based on rocking of the musical instrument when in the second mode. Through detecting rocking of the musical instrument by the detecting means, the musical sound receiving means can be returned from the power saving state at a timing before the performance is started. In other words, the performance can be started immediately after returning from the power saving state.

Further, the detecting means may detect rocking of the musical instrument based on an output value of an acceleration sensor.

By detecting the acceleration, it is possible to detect a preparatory action for performing, such as "lifting the musical instrument" or "holding the musical instrument".

In addition, the musical sound receiving means may perform a process of muting a sound from a time of receiving the detected information until a predetermined time elapses. Further, the predetermined time may be a time required for at least part of electronic components to recover from a state in which an applied voltage is reduced to a predetermined value or less, to a state of being equal to or greater than the predetermined value.

By temporarily muting the sound when returning from the power saving state, it is possible to suppress noise which occurs due to the application of the voltage to the electronic components.

Also, the detected information may include an identifier of the musical sound receiving means paired with the musical sound transmitting means, and the controlling means may cancel the second mode and switch to the first mode when the identifier included in the detected information that has been received matches its own identifier.

With the musical sound transmitting means holding and transmitting the identifier of the musical sound receiving means (i.e., the musical sound receiving means that should be returned from the power saving state) in the pairing state, the musical sound receiving means can accurately determine whether to return from the power saving state.

The musical sound transmitting means may include a phone plug for connecting with the musical instrument and the musical sound receiving means, the musical sound receiving means may include a phone jack for connecting with the musical sound transmitting means, and the musical sound transmitting means may request the pairing with the musical sound receiving means when connected with the phone jack included in the musical sound receiving means.

Accordingly, the pairing may be performed by using a physical terminal for connecting the musical instrument and the musical sound transmitting means. Through this configuration, the operation can be switched between inserting the musical sound transmitting means into the musical instrument and inserting into the musical sound receiving means.

The musical sound receiving means may apply a voltage to a ring terminal of the phone jack, and the musical sound transmitting means may detect connection with the musical sound receiving means based on a voltage applied to a ring terminal of the phone plug. Also, the musical sound receiving means may transmit a signal to the ring terminal of the phone jack, and the musical sound transmitting means may detect connection with the musical sound receiving means based on a signal received from a ring terminal of the phone plug.

Through this configuration, by determining whether a voltage is applied to the ring terminal or whether a signal is transmitted by the ring terminal, the musical sound transmitting means can determine whether it is connected to the musical sound receiving means or the musical instrument. In other words, pairing can be started without performing a complicated operation.

Also, the musical sound receiving means may transmit its own identifier via the ring terminal in response to the request, and the musical sound transmitting means may store the transmitted identifier as the identifier of the paired musical sound receiving means.

Accordingly, by transmitting the identifier via the ring terminal, it is possible to reliably transmit the identifier to the musical sound transmitting means which is the pairing destination. Also, any serial communication standard or the like may be used for transmitting the identifier.

In addition, the detected information may be wirelessly transmitted at a fixed first frequency, and the audio signal may be wirelessly transmitted at a second frequency determined when the musical sound transmitting means and the musical sound receiving means are paired with each other.

The first frequency may be a fixed frequency used only for transmitting the detected information. On the other hand, the second frequency may be, for example, a frequency dynamically determined by scanning an empty channel from a predetermined frequency band. Through this configuration, the monitoring circuit of the detected information can be simplified, and the power consumption in the power saving state can be further suppressed.

The disclosure may be specified as an electric musical instrument system including at least part of the above means. It may also be specified as a control method of the electric musical instrument system. It may also be specified as a program for executing the control method. The above processes and means may be freely combined and implemented as long as no technical contradiction occurs.

DESCRIPTION OF THE EMBODIMENTS

The electric musical instrument system according to the present embodiment includes a transmitter 10 which wirelessly transmits an audio signal outputted from an electronic musical instrument and a guitar amplifier 20 which receives, amplifies, and outputs the wirelessly transmitted audio signal.

Figure 1:
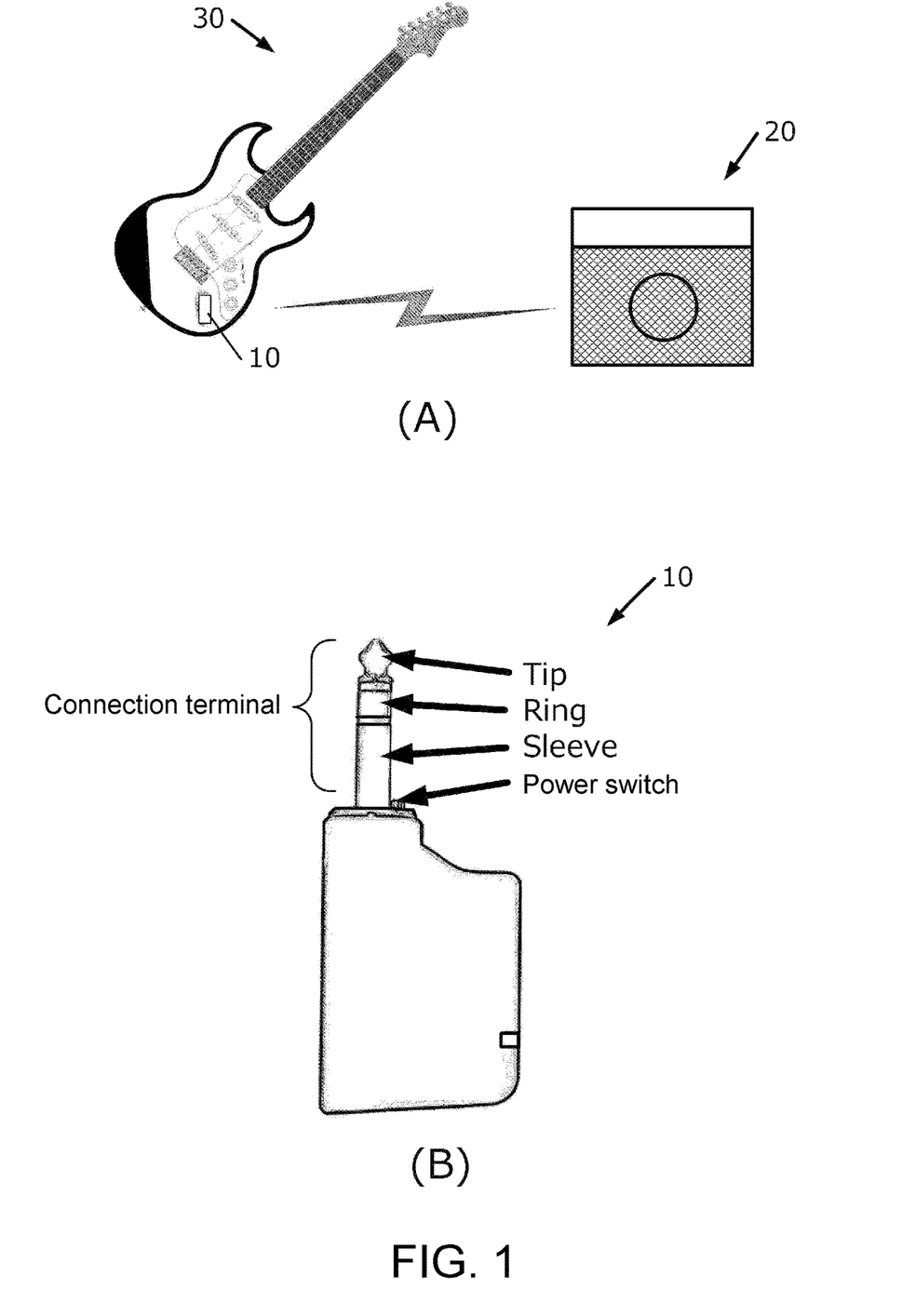
FIG. 1 shows a configurational view of an electric musical instrument system and an appearance view of a transmitter 10.

(A) of FIG. 1 shows an overall configurational view of the electric musical instrument system according to the present embodiment. The transmitter 10 is a portable device (i.e., a musical sound transmitting means in the disclosure) which is connected with a portable electronic musical instrument having a performance operating device (i.e., an electronic guitar 30 in the present embodiment) and wirelessly transmits the audio signal outputted by the electronic musical instrument. (B) of FIG. 1 is a view showing the appearance of the transmitter 10. As shown in the figure, the transmitter 10 may be connected with the electronic musical instrument by a phone plug having a three-pole connection terminal. In a state of being inserted into an audio output terminal (phone jack) of the electronic musical instrument, the transmitter 10 acquires the audio signal from the electronic musical instrument and wirelessly transmits the audio signal. In the present embodiment, it is assumed that the electronic musical instrument to which the transmitter 10 is connected has a two-pole connection terminal (i.e., a sleeve and a tip). The usage of the ring terminal will be described later.

The electronic guitar 30 has a plurality of strings and a pickup which detects the vibration of the strings, and the electronic guitar 30 detects the vibration of the strings by the pickup, converts the vibration into an electric signal (audio signal), and outputs the electric signal. The electronic guitar 30 outputs the audio signal to the transmitter 10 via the phone jack. The outputted audio signal is modulated and wirelessly transmitted by the transmitter 10, and is received and demodulated by the guitar amplifier 20 (i.e., a musical sound receiving means in the disclosure). The audio signal demodulated by the guitar amplifier 20 is amplified and outputted from a speaker.

Figure 2:
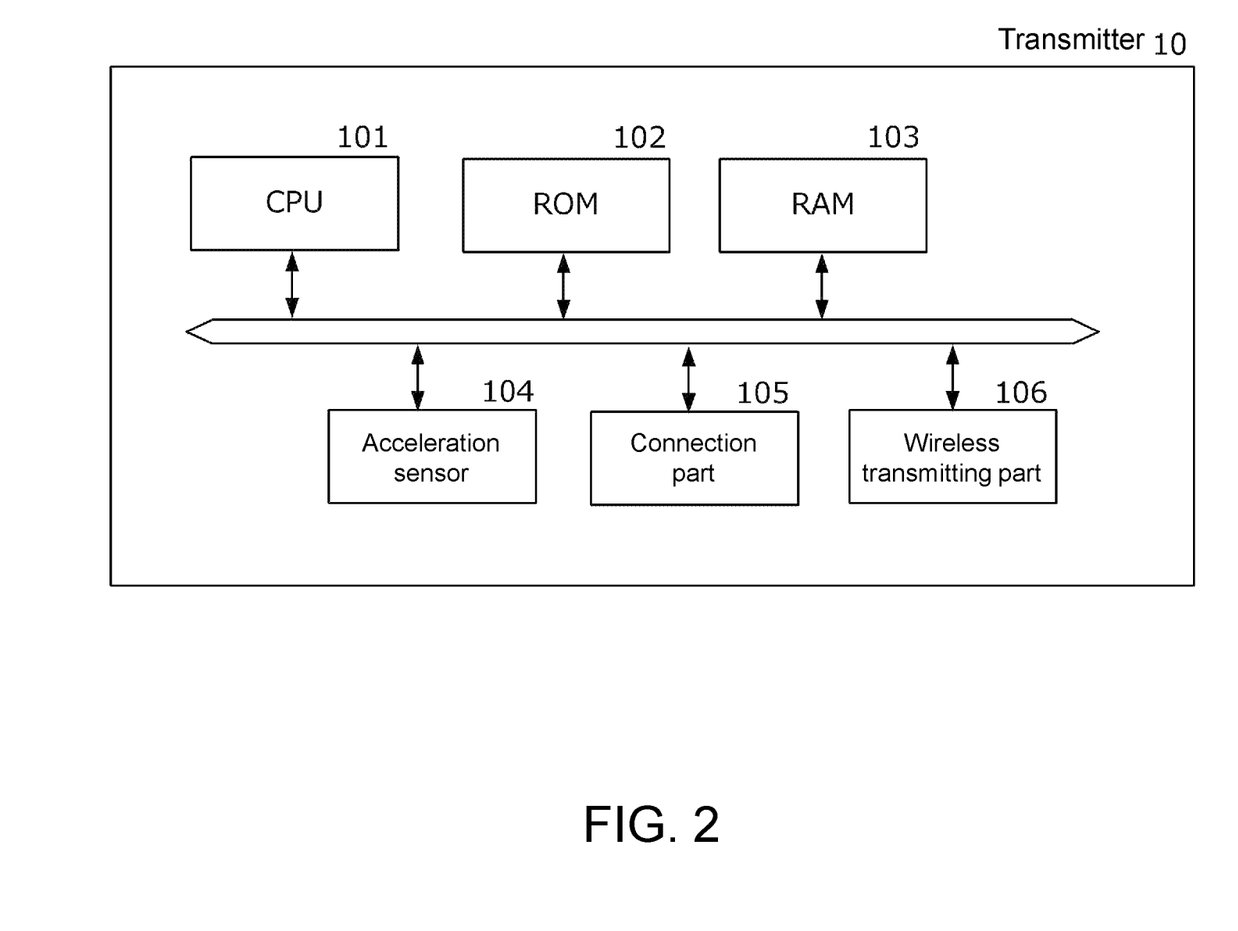
FIG. 2 is a hardware configurational view of the transmitter 10.

Referring to FIG. 2, the hardware configuration of the transmitter 10 will be described. The transmitter 10 includes a CPU (central processing unit) 101, a ROM 102, a RAM 103, an acceleration sensor 104, a connection part 105, and a wireless transmitting part 106. These means are driven by electric power supplied from a rechargeable battery (not shown).

The CPU 101 is a computation device which governs the control performed by the transmitter 10. The ROM 102 is a rewritable nonvolatile memory. The ROM 102 stores a control program executed by the CPU 101 and data used by the control program (e.g., the time from the stop of the performance to the transition to a power saving mode, etc.). The RAM 103 is a memory in which the control program executed by the CPU 101 and the data used by the control program are developed. The program stored in the ROM 102 is loaded into the RAM 103 and executed by the CPU 101, so that the processes described below are performed. It is noted that the configuration shown in FIG. 2 is an example, and all or some of the shown functions may be executed by using an exclusively designed circuit. Further, the program may be stored or executed by a combination of a main storage device and an auxiliary storage device other than those shown in the figure.

The acceleration sensor 104 is a triaxial acceleration sensor which may acquire acceleration in each of X-axis, Y-axis, and Z-axis directions. The acceleration sensor 104 may detect rocking or movement of the transmitter 10, the borne gravity, vibration, impact, etc. The value (sensor data) outputted by the acceleration sensor 104 is acquired by the CPU 101.

The connection part 105 is an interface for physically connecting the transmitter 10 and the electronic guitar 30. The connection part 105 has the connection terminal shown in (B) of FIG. 1 and can acquire the audio signal from the electronic guitar 30 when connected with the electronic guitar 30. The connection part 105 is also configured to be connectable to a connection part 205 included in the guitar amplifier 20 to be described later. The detailed configuration will be described later. A power switch is arranged in the vicinity of the connection terminal of the connection part 105, and by inserting the plug, the power switch is pressed to turn on the power.

The wireless transmitting part 106 is a wireless communication interface which wirelessly transmits a signal. In the present embodiment, the wireless transmitting part 106 transmits two types of signals to the guitar amplifier 20: (1) an audio signal outputted by the electronic guitar 30, and (2) a control signal for the guitar amplifier 20. The means described above are communicatively connected by a bus.

The transmitter 10 is configured to be operable in either a normal operation mode or a power saving mode in which power consumption is suppressed. When operating in the power saving mode, the transmitter 10 suspends its functions except the minimum functions necessary for determining whether to return from the power saving mode and for returning the guitar amplifier 20 from the power saving mode based on the determination.

Figure 3:
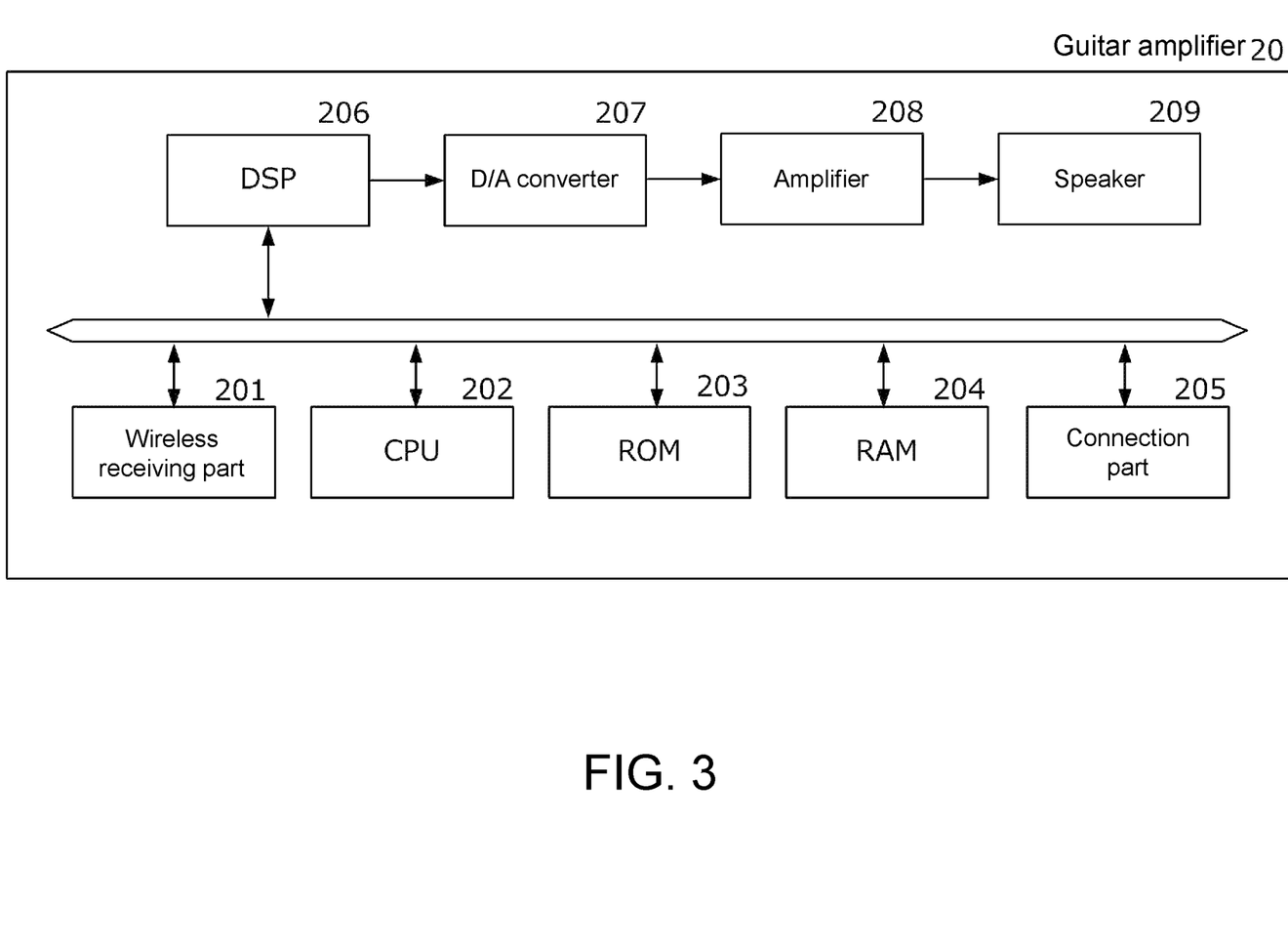
FIG. 3 is a hardware configurational view of a guitar amplifier 20.

Next, referring to FIG. 3, the hardware configuration of the guitar amplifier 20 will be described. The guitar amplifier 20 is a device which amplifies and outputs the audio signal wirelessly transmitted from the transmitter 10. The guitar amplifier 20 includes a wireless receiving part 201, a CPU 202, a ROM 203, a RAM 204, a connection part 205, a DSP 206, a D/A converter 207, an amplifier 208, and a speaker 209. These means are driven by electric power supplied from a rechargeable battery (not shown).

The wireless receiving part 201 is a wireless communication interface which receives a signal transmitted from the transmitter 10. In the present embodiment, the wireless receiving part 201 is wirelessly connected with the wireless transmitting part 106 included in the transmitter 10 and receives two types of signals: (1) an audio signal outputted by the electronic guitar 30, and (2) a control signal transmitted from the transmitter 10.

The CPU 202 is a computation device which governs the control performed by the guitar amplifier 20. Specifically, it performs the processing described in this specification, the scanning of an operator (not shown) provided on a guitar amplifier body, the updating of a value set by the operator, and the like. The ROM 203 is a rewritable nonvolatile memory. The ROM 203 stores a control program executed by the CPU 202 and data used by the control program (e.g., a list of frequencies and channels of the wireless communication performed between the guitar amplifier 20 and the transmitter 10, an ID of the guitar amplifier 20, etc.). The RAM 204 is a memory in which the control program executed by the CPU 202 and the data used by the control program are developed. The program stored in the ROM 203 is loaded into the RAM 204 and executed by the CPU 202, so that the processes described below are performed. It is noted that the configuration shown in FIG. 3 is an example, and all or part of the shown functions may be executed by using an exclusively designed circuit. Further, the program may be stored or executed by a combination of a main storage device and an auxiliary storage device other than those shown in the figure.

The connection part 205 is an interface for physically connecting the guitar amplifier 20 and the transmitter 10. The connection part 205 has a phone jack into which the connection terminal shown in (B) of FIG. 1 may be inserted. By inserting the transmitter 10 into the phone jack of the connection part 205, information exchange (hereinafter referred to as pairing) for linking each other is performed between the transmitter 10 and the guitar amplifier 20.

The phone jack of the connection part 205 has a three-pole connection terminal, and a predetermined voltage (e.g., 5 V) is applied to the ring terminal. By detecting the voltage, the transmitter 10 can determine whether the connection destination is the guitar amplifier 20 or the electronic guitar 30. In addition, the transmitter 10 may charge a built-in battery by using the voltage.

The DSP 206 is a microprocessor specialized for digital signal processing. In the present embodiment, the DSP 206 performs processing specialized for audio signal processing under the control of the CPU 202. Specifically, the signal acquired via the wireless receiving part 201 is decoded to acquire an audio signal, and effect is imparted as necessary. The audio signal outputted from the DSP 206 is converted into an analog signal by the D/A converter 207, amplified by the amplifier 208, and then outputted from the speaker 209.

The guitar amplifier 20 is also configured to be operable in either a normal operation mode or a power saving mode in which power consumption is suppressed. When operating in the power saving mode, the guitar amplifier 20 suspends its functions except the minimum functions necessary for returning from the power saving mode based on the control signal transmitted from the transmitter 10. In the power saving mode, the power of hardware unnecessary during standby (e.g., the DSP 206, the D/A converter 207, the amplifier 208, etc.) is cut off.

Figure 4:
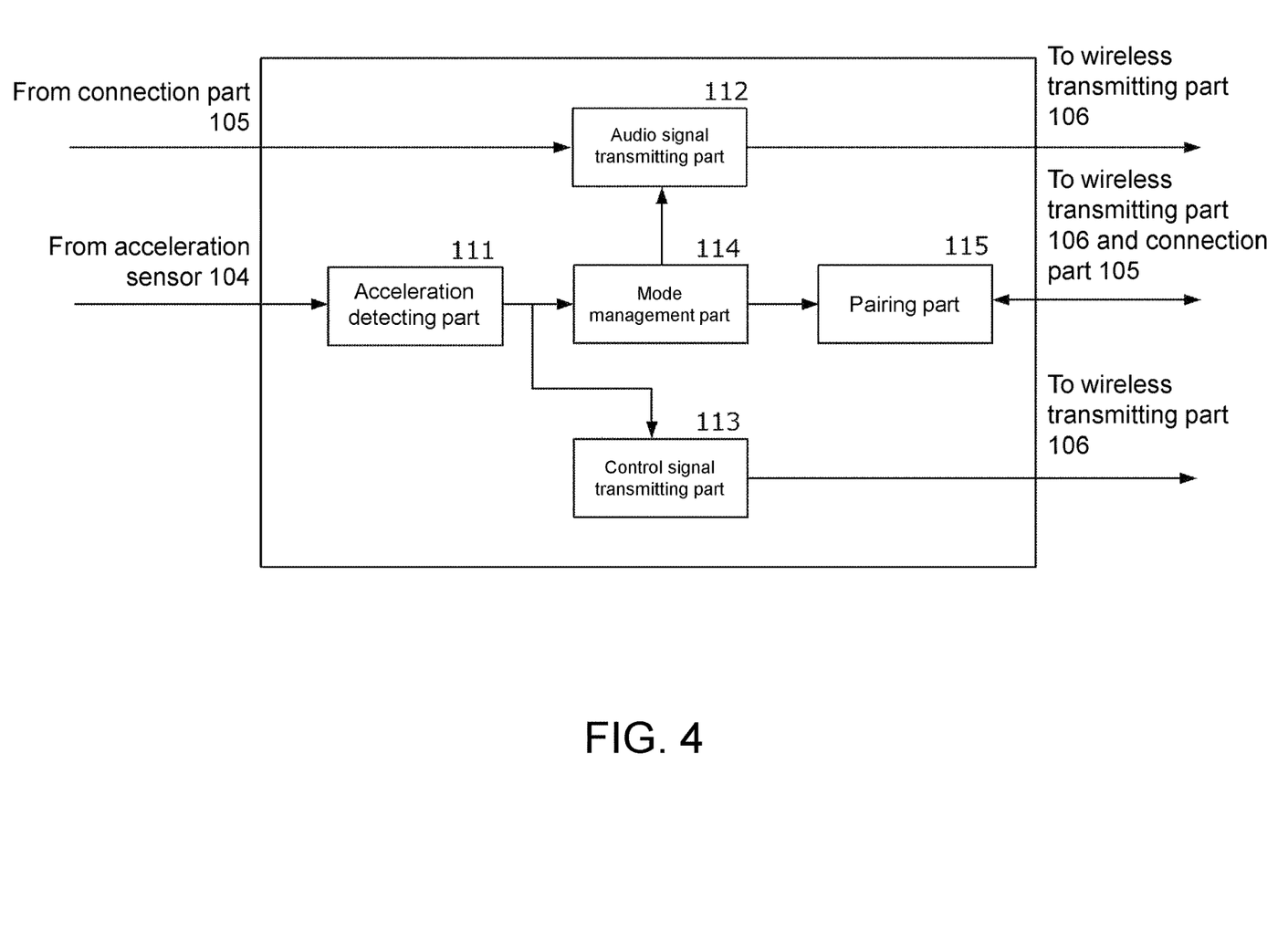
FIG. 4 is a software functional block diagram corresponding to the transmitter 10.

FIG. 4 is a view in which processes executed by the transmitter 10 (CPU 101) are represented by functional blocks. The modes will be described later.

An acceleration detecting part 111 acquires acceleration in each of the X-axis, Y-axis, and Z-axis directions based on the sensor data obtained from the acceleration sensor 104. The acquired acceleration is transmitted to a mode management part 114 and a control signal transmitting part 113 to be described later. In a performance mode, an audio signal transmitting part 112 acquires the audio signal from the electronic guitar 30 via the connection part 105, and wirelessly transmits the acquired audio signal to the guitar amplifier 20 via the wireless transmitting part 106. The control signal transmitting part 113 generates a wakeup signal based on the acceleration acquired by the acceleration detecting part 111, and wirelessly transmits the wakeup signal to the guitar amplifier 20 via the wireless transmitting part 106. The mode management part 114 switches between the performance mode and a standby mode based on the acceleration acquired by the acceleration detecting part 111. Also, the mode management part 114 monitors the connection with the guitar amplifier 20 and switches between the performance mode and a pairing mode. In the pairing mode, a pairing part 115 exchanges information for performing pairing with the guitar amplifier 20.

Figure 5:
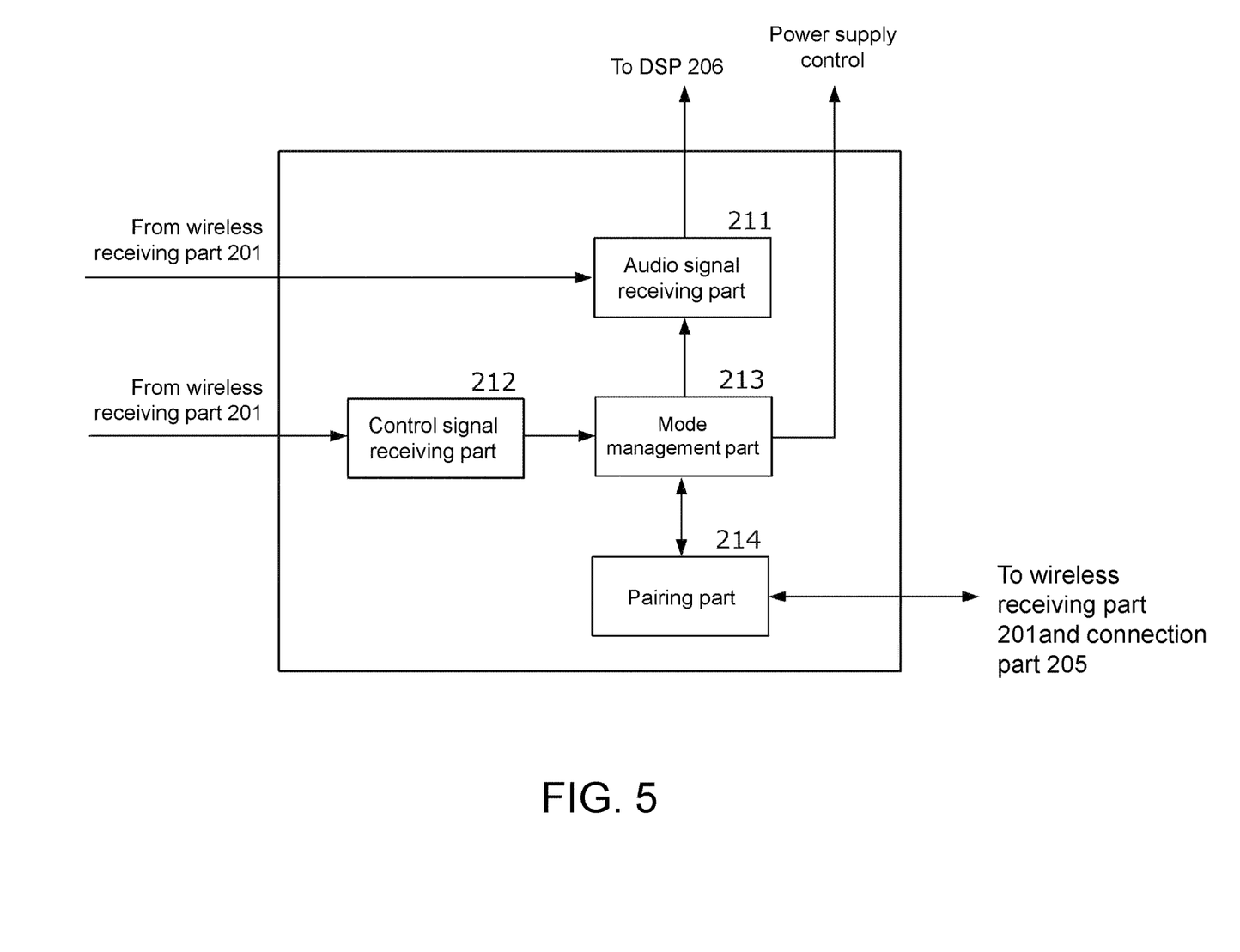
FIG. 5 is a software functional block diagram corresponding to the guitar amplifier 20.

FIG. 5 is a view in which processes executed by the guitar amplifier 20 (CPU 202) are represented by functional blocks. In the performance mode, an audio signal receiving part 211 receives an audio signal transmitted from the transmitter 10 via the wireless receiving part 201. The received audio signal is transmitted to the DSP 206. In the standby mode, a control signal receiving part 212 receives a wakeup signal transmitted from the transmitter 10 via the wireless receiving part 201. A mode management part 213 switches between the performance mode and the standby mode based on the received wakeup signal. Also, the mode management part 213 monitors the connection with the transmitter 10 and switches between the performance mode and the pairing mode. In addition, the mode management part 213 controls the power supply of the device according to the mode of the device itself. In the pairing mode, a pairing part 214 exchanges information for performing pairing with the transmitter 10.

Next, details of the processes performed by the guitar amplifier 20 and the transmitter 10 will be described. The guitar amplifier 20 and the transmitter 10 are configured to be able to transition among three states, i.e., a mode for performing pairing (pairing mode), a mode for performing performance (performance mode), and a power saving mode (standby mode).

First, the pairing mode will be described. In order to link the electronic guitar 30 and the guitar amplifier 20, it is necessary to pair the guitar amplifier 20 and the transmitter 10 inserted into the electronic guitar 30. In the present embodiment, by inserting the phone plug of the transmitter 10 into the phone jack of the guitar amplifier 20, the transmitter 10 and the guitar amplifier 20 are each switched to the pairing mode.

Figure 6:
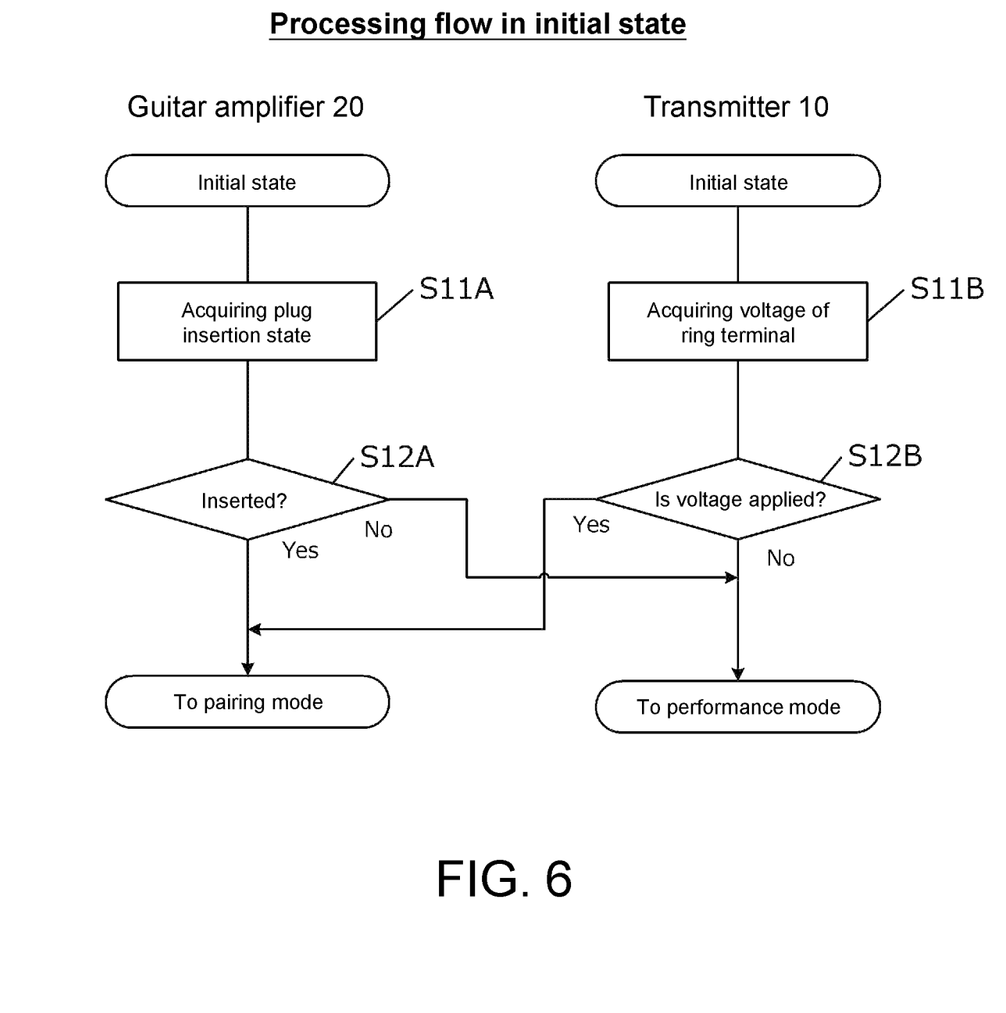
FIG. 6 is a flowchart of processes in an initial state.

FIG. 6 is a flowchart showing processes respectively performed by the transmitter 10 and the guitar amplifier 20. In the following description, the execution entity of the process performed by the transmitter 10 is the CPU 101, and the execution entity of the process performed by the guitar amplifier 20 is the CPU 202.

First, the process performed by the guitar amplifier 20 will be described. In step S11A, the guitar amplifier 20 learns whether a plug (phone plug) is inserted into the phone jack of the connection part 205. Whether the plug is inserted into the phone jack can be electrically detected. As a result, when it is determined that the plug is inserted, the mode switches to the pairing mode, and when it is determined that the plug is not inserted, the mode switches to the performance mode (step S12A).

Next, the process performed by the transmitter 10 will be described. In step S11B, the transmitter 10 acquires a voltage applied to the ring terminal of the phone plug of the connection part 105. Herein, when a predetermined voltage is applied to the ring terminal, it is determined that it is inserted into the guitar amplifier 20, and the mode switches to the pairing mode. When the voltage is not applied, it is determined that it is inserted into the electronic guitar 30, and the mode switches to the performance mode (step S12B). Since the electronic musical instrument such as the electronic guitar 30 does not have the ring terminal itself, the voltage is always 0 V when the transmitter 10 is inserted into the electronic musical instrument.

Figure 7:
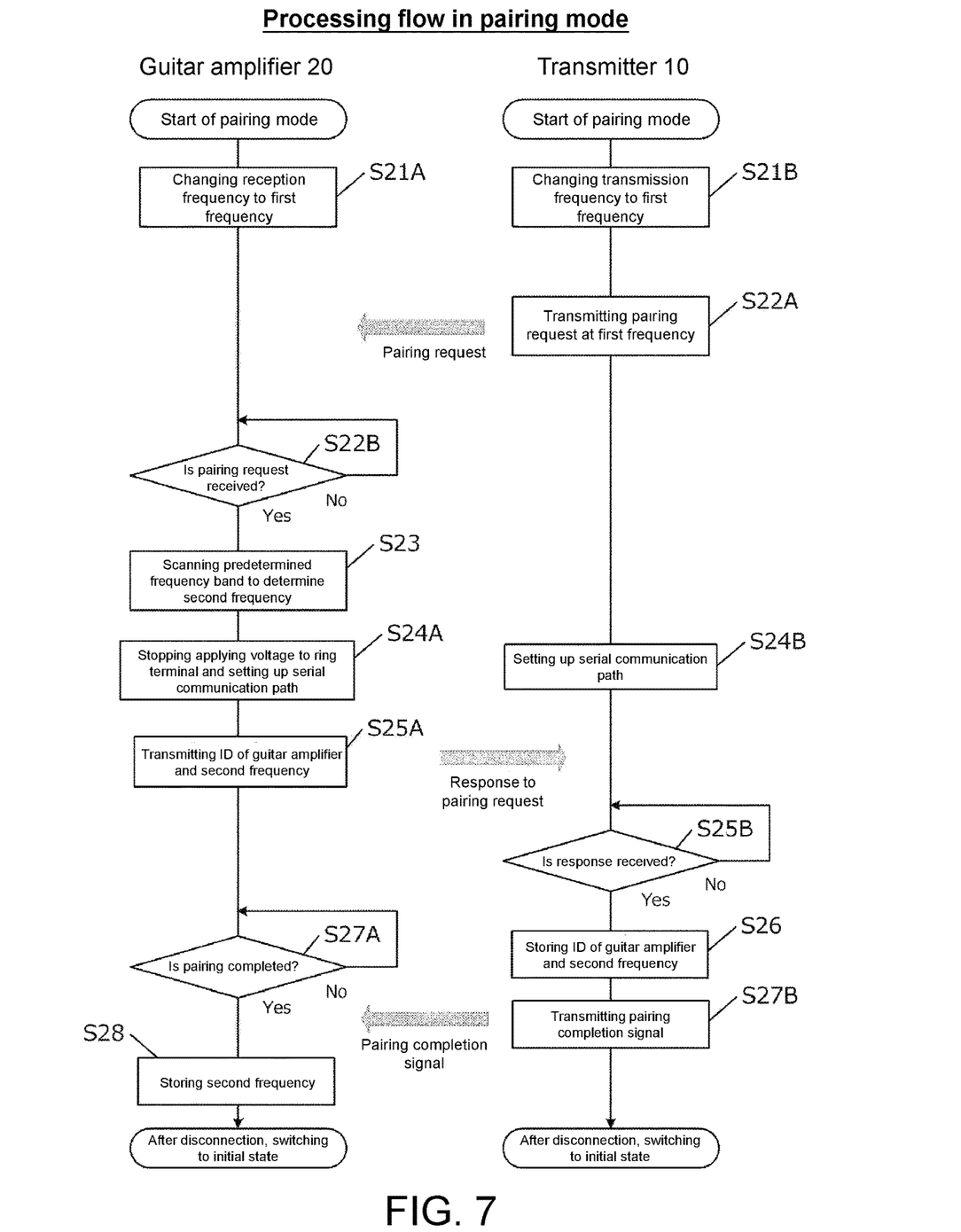
FIG. 7 is a flowchart of processes in a pairing mode.

Next, the processing flow in the pairing mode will be described with reference to FIG. 7. When the pairing mode is started, the guitar amplifier 20 changes a reception frequency of the wireless receiving part 201 to a first frequency (step S21A). In the present embodiment, the first frequency is a control frequency for transmitting and receiving control signals other than the audio signal. Similarly, the transmitter 10 changes a transmission frequency of the wireless transmitting part 106 to the first frequency (step S21B). The first frequency is fixed and pre-stored in the ROM 102 and the ROM 203.

Next, the transmitter 10 transmits a control signal (pairing request) which requests pairing to the guitar amplifier 20 by using the first frequency (step S22A). The guitar amplifier 20 waits until it receives the pairing request (step S22B).

When receiving the pairing request, the guitar amplifier 20 scans a plurality of channels set in a predetermined frequency band by using the wireless receiving part 201 to detect an empty channel, and temporarily stores the frequency of the empty channel as a second frequency in the RAM 204 (step S23). In the present embodiment, the second frequency is a frequency for transmitting the audio signal. The second frequency is variable and is selected by the guitar amplifier 20 from a plurality of predetermined channels when pairing is performed. The channels to be scanned are pre-stored in the ROM 203. By detecting an empty channel from the plurality of channels, it is possible to prevent crosstalk even when there are a plurality of sets of the transmitter 10 and the guitar amplifier 20.

The determination of the second frequency in step S23 may be started at a timing before receiving the pairing request. In that case, since the pairing request may be received during the scanning for determining the second frequency, interference may occur. In order to avoid this, it is preferable to take measures such as sufficiently separating the frequency band to be scanned from the first frequency, or correcting the influence of the first frequency on the scan result.

Next, the guitar amplifier 20 stops applying the voltage to the ring terminal and sets up a serial communication path (step S24A). Similarly, the transmitter 10 also sets up a serial communication path (step S24B). After this step, the transmitter 10 and the guitar amplifier 20 exchange information necessary for pairing through performing I2C communication by using the ring terminal and the sleeve terminal as signal lines. While I2C is used as the serial communication standard in the present embodiment, SPI, UART, or the like may also be used.

When the serial communication path is formed, the guitar amplifier 20 transmits its own ID (i.e., a unique identifier for each guitar amplifier) and the determined second frequency to the transmitter 10 via the serial communication path as a response to the pairing request (step S25A). In step S25A, retry is repeatedly executed until the transmitter 10 receives the transmitted data. The transmitter 10 waits until the information is transmitted from the guitar amplifier 20 (step S25B). When receiving the response to the pairing request, the transmitter 10 stores the transmitted ID of the guitar amplifier 20 and the second frequency in the RAM 103 (step S26), and then transmits a signal indicating that the pairing is completed to the guitar amplifier 20 (step S27B). The guitar amplifier 20 waits until the signal is transmitted from the transmitter 10 (step S27A), and then stores the second frequency (step S28).

Through the process described above, the pairing between the guitar amplifier 20 and the transmitter 10 is completed. When the pairing is completed, the second frequency for transmitting and receiving the audio signal is shared by the guitar amplifier 20 and the transmitter 10. In addition, the transmitter 10 is in a state of having acquired the ID of the corresponding guitar amplifier 20. When the pairing is completed, the guitar amplifier 20 and the transmitter 10 disconnect the serial connection and switch to an initial state.

Figure 8:
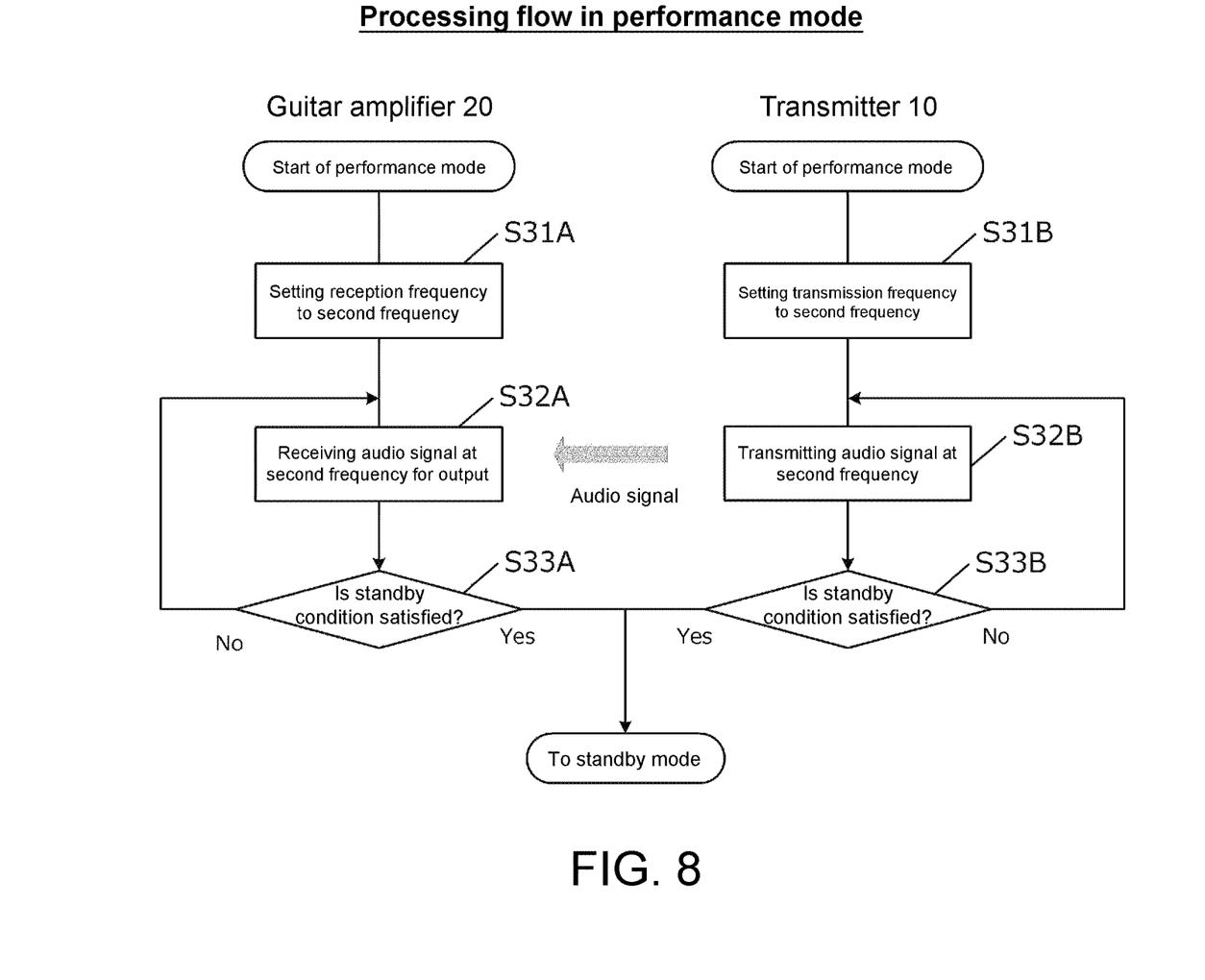
FIG. 8 is a flowchart of processes in a performance mode.

Next, the processing flow in the performance mode will be described with reference to FIG. 8. When the performance mode is started, the guitar amplifier 20 sets the reception frequency of the wireless receiving part 201 to the second frequency (step S31A). Further, the transmitter 10 sets the transmission frequency of the wireless transmitting part 106 to the second frequency (step S31B). Next, the transmitter 10 modulates the audio signal inputted from the electronic guitar 30, and transmits it at the second frequency (step S32B). The transmitted signal is received and demodulated by the guitar amplifier 20. The demodulated audio signal is amplified and outputted from the speaker (step S32A). In step S32A, it may be determined whether the transmitted packet is in a predetermined format, and the process may proceed only when the format is valid.

Next, each of the guitar amplifier 20 and the transmitter 10 determines whether to switch to the standby mode. In step S33A, the guitar amplifier 20 measures the time in which the guitar amplifier 20 is not continuously used, and determines that the standby condition is satisfied when the measured time exceeds a predetermined value. For example, using a counter which counts up every predetermined time when the audio signal is not received (and a main body operation is not performed) and clears the count at the timing when the audio signal is received (and the main body operation is performed), when the counter exceeds a predetermined value, it is determined that the standby condition is satisfied. The predetermined value may be stored in the ROM 203 or may be set based on a user input.

When the standby condition is satisfied in step S33A, the guitar amplifier 20 switches to the standby mode. Specifically, the reception frequency of the wireless receiving part 201 is switched to the first frequency, and functions other than the functions necessary for receiving the wakeup signal (including the function of determining that the main body operation is performed) are stopped. As a result, the execution of the CPU 202 is switched to a low power mode, and the power supply to unnecessary hardware blocks is stopped.

In step S33B, the transmitter 10 measures the time in which the electronic guitar 30 is not continuously used, and determines that the standby condition is satisfied when the measured time exceeds a predetermined value (e.g., 5 minutes, 30 minutes, etc.). The fact that the electronic guitar 30 is not used may be determined, for example, based on the acceleration detected by the acceleration sensor 104.

For example, the acceleration outputted by the acceleration sensor 104 is acquired in a time series for each axis, and after obtaining a sum of squares of difference values of the acceleration obtained for each axis, it may be determined that the electronic guitar 30 is in use when the sum of squares exceeds a threshold value. The threshold value used for the determination may be, for example, a value based on gravitational acceleration. Through this configuration, it is possible to determine whether the electronic guitar 30 is in a stationary state (i.e., a state in which it is not used or played).

For example, using a counter which counts up every predetermined time when the sum of squares does not exceed the threshold value and clears the count when the sum of squares exceeds the threshold value, when the counter exceeds a predetermined value, it may be determined that the standby condition is satisfied. While the output of the acceleration sensor 104 is used in this example, the time in which the audio signal is not received may also be counted as in the case of the guitar amplifier 20. The predetermined value may be stored in the ROM 102 or may be set based on a user input.

When the standby condition is satisfied in step S33B, the transmitter 10 switches to the standby mode. Specifically, the transmission frequency of the wireless transmitting part 106 is switched to the first frequency, and functions other than the functions necessary for determining whether to return from the standby mode are stopped. As a result, the execution of the CPU 101 is switched to a low power mode, and the power supply to unnecessary hardware blocks is stopped.

When the standby condition is not satisfied in step S33A and step S33B, the process transitions to step S32A (S32B), and the transmission of the audio signal is continued. While the transmission of the audio signal is continued in this example, for example, when it is clear that the performance is not continuing (e.g., when the transmitter 10 is removed from the electronic guitar 30), the mode may be returned to the initial state.

Figure 9:
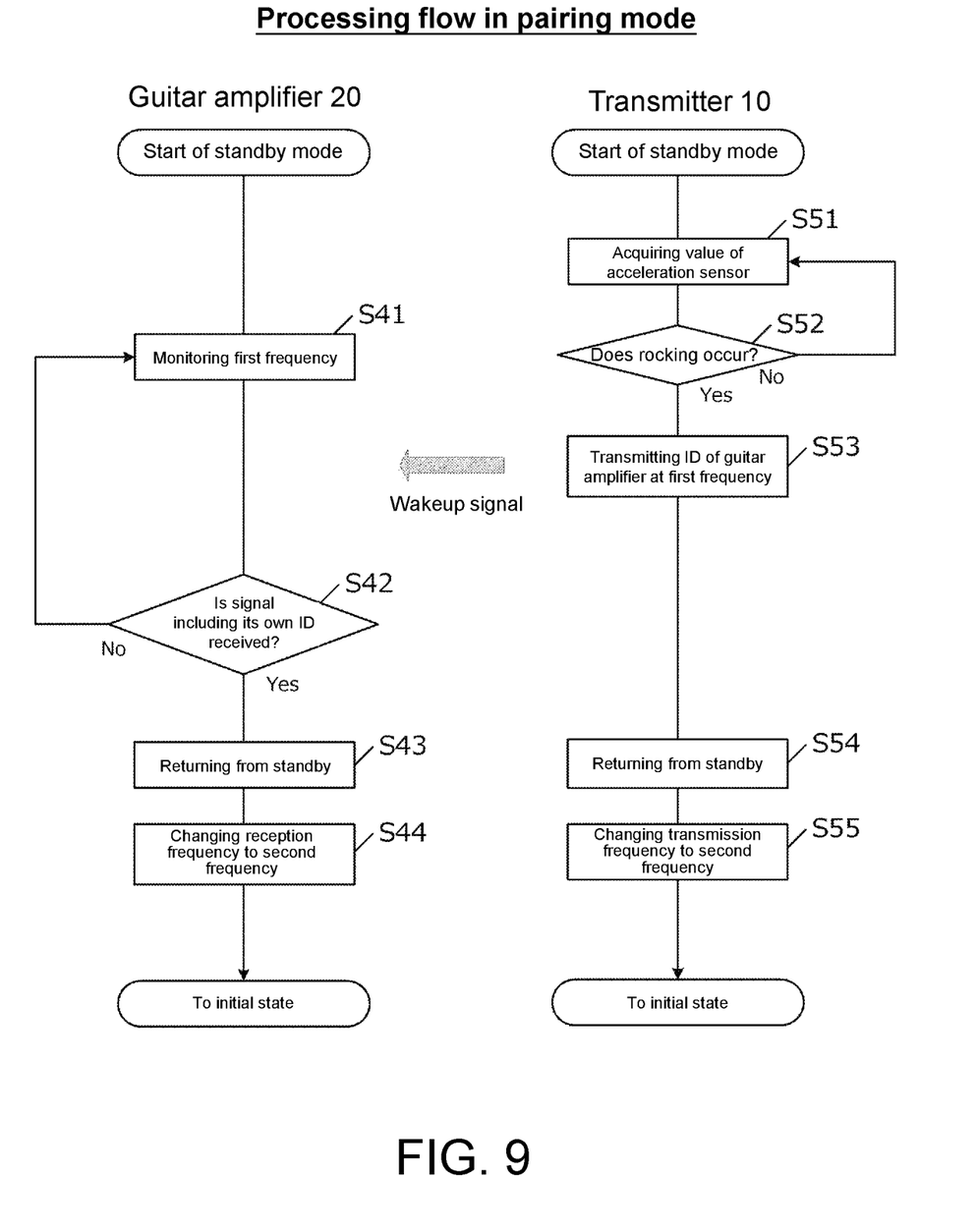
FIG. 9 is a flowchart of processes in a standby mode.

Next, the processing flow in the standby mode will be described with reference to FIG. 9. First, the process of the transmitter 10 will be described. In the standby mode, the transmitter 10 periodically acquires the output value of the acceleration sensor 104 (step S51) and detects whether rocking occurs based on the output value (step S52). Accordingly, it is determined whether the use of the electronic guitar 30 has been resumed.

In this step, for example, the acceleration for each axis outputted by the acceleration sensor 104 is acquired, and the resumption of use may be determined based on a result of comparing the acquired acceleration with a threshold value set for each axis. More specifically, it may be determined that the use has resumed when the acceleration for each axis acquired by the acceleration sensor 104 changes from below the threshold value set for each axis to above the threshold value, or changes from above the threshold value to below the threshold value. The threshold value for determining the resumption of use may be a fixed value or a value set based on the acceleration detected immediately before switching to the standby mode.

Further, the resumption of use of the electronic guitar 30 may be determined based on a change in acceleration. For example, the acceleration outputted by the acceleration sensor 104 is acquired in a time series for each axis, and it may be determined that the use of the electronic guitar 30 has resumed when the change in the acceleration (or the total of the accelerations) obtained for each axis is equal to or greater than a predetermined value.

When it is determined that the use of the electronic guitar 30 has resumed, using the first frequency, the transmitter 10 transmits the ID of the guitar amplifier 20 (i.e., paired) stored in the RAM 103 as a wakeup signal (step S53). In this step, it is not always necessary to wait for a response from the guitar amplifier 20. For example, the process may proceed after the wakeup signal is transmitted multiple times in a predetermined period (e.g., 1 second).

Next, the process performed by the guitar amplifier 20 in the standby mode will be described. In the standby mode, the guitar amplifier 20 monitors the control signal transmitted at the first frequency (step S41), and determines whether a wakeup signal including its own ID is received (step S42). Herein, when the wakeup signal including its own ID is received, a return process from the standby mode is performed (step S43). Further, the reception frequency of the wireless receiving part 201 is changed to the second frequency (step S44).

In step S43, since power is re-supplied to the hardware of which the power has been cut off, relatively large noise may be generated and outputted via the speaker. Therefore, the amplifier 208 may be muted until the state is completely restored. For example, a mute process may be performed at a timing when the process of returning from the standby mode is started, and the mute may be canceled after the power supply is stabilized. For example, the condition for canceling the mute may be when the power supply waveform is stable, the charging of the capacitor is completed, the clearing of the audio buffer is completed, the resetting of the user setting value is completed, or the like.

Figure 10:
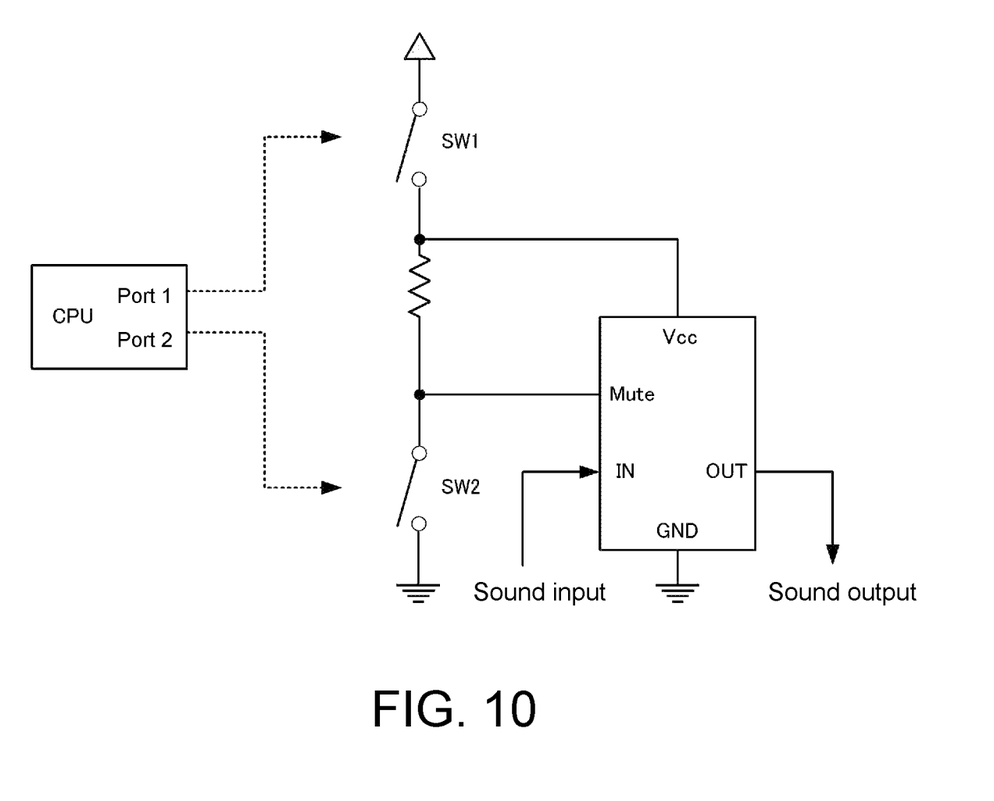
FIG. 10 shows an example of a circuit for causing an amplifier to mute.

FIG. 10 is a view showing a circuit for performing mute control on the amplifier 208. Prior to the start of the return process from the standby mode, the CPU controls a port 2 in advance and opens SW2. When the return process from the standby mode is started, the CPU controls a port 1 to turn on SW1, and starts the power supply to a peripheral circuit of the amplifier 208. At the same time, a timer (not shown) is turned on to start counting time. As the voltage to a power supply terminal Vcc increases, since the same voltage as the terminal Vcc is applied to a terminal Mute of the amplifier 208, the audio output of the amplifier 208 is in a mute state. Afterwards, when the CPU detects that a predetermined time (the time until the voltage applied to the power supply terminal Vcc sufficiently stabilizes) has elapsed, SW2 is turned on via the port 2. As a result, the terminal Mute becomes Low, and the mute state of the amplifier 208 is canceled. In other words, the sound inputted to the amplifier 208 can be outputted from the connected speaker.

The return from the standby mode is also performed in the transmitter 10 at the same time (step S54). When returning from the standby mode, the transmitter 10 changes the transmission frequency of the wireless transmitting part 106 to the second frequency (step S55). As a result, it is possible to resume the transmission and reception of the audio signal at the second frequency. A wait time may be inserted between the time of executing step S55 and the time of returning to the initial state. Accordingly, for example, it is possible to wait for a time required for the guitar amplifier 20 to return from the standby mode, and then start transmitting the audio signal.

As described above, in the electric musical instrument system according to the present embodiment, based on the acceleration detected by the transmitter 10, resumption of the performance is predicted, and the transmitter 10 and the guitar amplifier 20 are returned from the standby mode. In particular, when a preparatory performance action such as lifting the musical instrument or holding the musical instrument is performed, since the musical instrument body rocks, the transmitter 10 detects the rocking and starts returning from the standby mode. Accordingly, it is possible to resume the performance immediately.

Also, since the wakeup signal is transmitted using a fixed frequency, the circuit used in the standby mode can be simplified, and power consumption can be further suppressed.

Furthermore, since the transmitter 10 and the guitar amplifier 20 are connected by using the phone plug used for connecting the transmitter 10 and the electronic musical instrument, pairing can be performed by a simple operation. In particular, with a voltage applied to the ring terminal, the transmitter 10 can determine the connection destination, and further, the transmitter 10 can be charged at the same time.

Modification Example

The above-described embodiment is merely an example, and the disclosure may be implemented with appropriate modifications without departing from the scope of the disclosure. For example, while the guitar amplifier has been shown as the musical sound receiving means in the description of the embodiment, a device other than this may also be connected. For example, it is also possible to combine an effector or the like. Also, while the transmitter and the guitar amplifier have been shown to be wirelessly connected with each other in the description of the embodiment, the connection may also be wired connection. Further, while the acceleration sensor has been used as the means for detecting the rocking of the musical instrument in the description of the embodiment, as long as the rocking of the musical instrument can be detected, other means (e.g., a distance sensor, a gyro sensor, a sensor that acquires another physical quantity, etc.) may also be used.

What is claimed is:

1. An electric musical instrument system comprising a musical sound transmitting means which transmits an audio signal emitted from a musical instrument and a musical sound receiving means which receives the audio signal, wherein the musical sound transmitting means and the musical sound receiving means both have a first mode and a second mode, wherein the second mode of the musical sound transmitting means has lower power consumption than the first mode of the musical sound transmitting means, and the second mode of the musical sound receiving means has lower consumption than the first mode of the musical sound receiving means, the musical sound transmitting means comprises:

a detecting means which detects rocking of the musical instrument; and a transmitting means which transmits the audio signal to the musical sound receiving means in the first mode of the musical sound transmitting means and, when the detecting means detects rocking of the musical instrument, transmits detected information to the musical sound receiving means in the second mode of the musical sound transmitting means, and the musical sound receiving means comprises:
a receiving means which receives the audio signal or the detected information; and
a controlling means which processes the audio signal that has been received in the first mode of the musical sound receiving means and, when the detected information is received in the second mode of the musical sound receiving means, cancels the second mode of the musical sound receiving means and switches to the first mode of the musical sound receiving means.

2. The electric musical instrument system according to claim 1, wherein the detecting means detects rocking of the musical instrument based on an output value of an acceleration sensor.

3. The electric musical instrument system according to claim 1, wherein the musical sound receiving means performs a process of muting a sound from a time of receiving the detected information until a predetermined time elapses.

4. The electric musical instrument system according to claim 3, wherein the predetermined time is a time required for at least part of electronic components to recover from a state in which an applied voltage is reduced to a predetermined value or less, to a state of being equal to or greater than the predetermined value.

5. The electric musical instrument system according to claim 1, wherein
the detected information comprises a paired identifier of a musical sound receiving means paired with the musical sound transmitting means, and
the controlling means cancels the second mode of the musical sound receiving means and switches to the first mode of the musical sound receiving means when the paired identifier included in the detected information that has been received matches an identifier of the musical sound receiving means.

6. The electric musical instrument system according to claim 5, wherein
the musical sound transmitting means comprises a phone plug for connecting with the musical instrument and the musical sound receiving means,
the musical sound receiving means comprises a phone jack for connecting with the musical sound transmitting means, and
the musical sound transmitting means requests the pairing with the musical sound receiving means when connected to the phone jack included in the musical sound receiving means.

7. The electric musical instrument system according to claim 6, wherein
the musical sound receiving means applies a voltage to a ring terminal of the phone jack, and
the musical sound transmitting means detects connection with the musical sound receiving means based on a voltage applied to a ring terminal of the phone plug.

8. The electric musical instrument system according to claim 7, wherein
the musical sound receiving means transmits the identifier of the musical sound receiving means via the ring terminal in response to the request, and
the musical sound transmitting means stores the identifier of the musical sound receiving means that has been transmitted from the musical sound receiving means as the paired identifier of the musical sound receiving means.

9. The electric musical instrument system according to claim 6, wherein
the musical sound receiving means sends a signal to a ring terminal of the phone jack, and
the musical sound transmitting means detects connection with the musical sound receiving means based on a signal received from a ring terminal of the phone plug.

10. The electric musical instrument system according to claim 1, wherein
the detected information is wirelessly transmitted at a fixed first frequency, and
the audio signal is wirelessly transmitted at a second frequency determined when the musical sound transmitting means and the musical sound receiving means are paired with each other.

11. A control method of an electric musical instrument system comprising a musical sound transmitting means which transmits an audio signal emitted from a musical instrument and a musical sound receiving means which receives the audio signal, wherein
the music sound transmitting means and the musical sound receiving means both have a first mode and a second mode in which power consumption is lower than that in the first mode, wherein the second mode of the musical sound transmitting means has lower power consumption than the first mode of the musical sound transmitting means, and the second mode of the musical sound receiving means has lower consumption than the first mode of the musical sound receiving means,
the method comprising:
detecting rocking of the musical instrument by the musical sound transmitting means;
transmitting the audio signal by the musical sound transmitting means to the musical sound receiving means in the first mode of the musical sound transmitting means and,
in a case when rocking of the musical instrument is detected by the musical sound transmitting means, the musical sound transmitting means transmits detected information to the musical sound receiving means in the second mode of the musical sound transmitting means;
receiving the audio signal or the detected information by the musical sound receiving means; and
processing the audio signal that has been received in the first mode of the musical sound receiving means and, in a case when the detected information is received in the second mode of the musical sound receiving means, cancels the second mode of the musical sound receiving means and switches to the first mode of the musical sound receiving means.

12. The control method of the electric musical instrument system according to claim 11, wherein the detecting rocking of the musical instrument is performed by detecting an acceleration of the musical instrument.

13. The control method of the electric musical instrument system according to claim 11, wherein the musical sound receiving means performs a process of muting a sound from a time of receiving the detected information until a predetermined time elapses.

14. The control method of the electric musical instrument system according to claim 13, wherein the predetermined time is a time required for at least part of electronic components of the electric musical instrument system to recover from a state in which an applied voltage is reduced to a predetermined value or less, to a state of being equal to or greater than the predetermined value.

15. The control method of the electric musical instrument system according to claim 11, wherein
 the detected information comprises a paired identifier of a musical sound receiving means paired with the musical sound transmitting means, and
 the second mode of the musical sound receiving means is canceled and switched to the first mode of the musical sound receiving means when the paired identifier included in the detected information received by the musical sound receiving means from the musical sound transmitting means matches an identifier of the musical sound receiving means.

16. The control method of the electric musical instrument system according to claim 15, wherein
 the musical sound transmitting means comprises a phone plug,
 the musical sound receiving means comprises a phone jack, and
 the musical sound transmitting means transmits a request for pairing with the musical sound receiving means when the phone plug of the musical sound transmitting means is connected to the phone jack of the musical sound receiving means.

17. The control method of the electric musical instrument system according to claim 16, wherein
 the musical sound receiving means applies a voltage to a ring terminal of the phone jack, and
 the musical sound transmitting means detects connection with the musical sound receiving means based on a voltage applied to a ring terminal of the phone plug.

18. The control method of the electric musical instrument system according to claim 17, wherein
 the musical sound receiving means transmits the identifier of the musical sound receiving means via the ring terminal in response to the request for pairing, and
 the musical sound transmitting means stores the identifier of the musical sound receiving means that has been transmitted from the musical sound receiving means as the paired identifier of the musical sound receiving means.

19. The control method of the electric musical instrument system according to claim 16, wherein
 the musical sound receiving means sends a signal to a ring terminal of the phone jack, and
 the musical sound transmitting means detects connection with the musical sound receiving means based on a signal received from a ring terminal of the phone plug.

20. A non-transitory computer-readable medium storing a control program of an electric musical instrument system comprising a musical sound transmitting means which transmits an audio signal emitted from a musical instrument and a musical sound receiving means which receives the audio signal, wherein the music sound transmitting means and the musical sound receiving means both have a first mode and a second mode in which power consumption is lower than that in the first mode, wherein the second mode of the musical sound transmitting means has lower power consumption than the first mode of the musical sound transmitting means, and the second mode of the musical sound receiving means has lower consumption than the first mode of the musical sound receiving means,
 the control program causes a computer to execute a process, the process render the musical sound transmitting means and the musical sound receiving means performing following steps:
 detecting rocking of the musical instrument by the musical sound transmitting means;
 transmitting the audio signal by the musical sound transmitting means to the musical sound receiving means in the first mode of the musical sound transmitting means and,
 in a case when rocking of the musical instrument is detected by the musical sound transmitting means, the musical sound transmitting means transmits detected information to the musical sound receiving means in the second mode of the musical sound transmitting means;
 receiving the audio signal or the detected information by the musical sound receiving means; and
 processing the audio signal that has been received in the first mode of the musical sound receiving means and, in a case when the detected information is received in the second mode of the musical sound receiving means, cancels the second mode of the musical sound receiving means and switches to the first mode of the musical sound receiving means.

* * * * *